United States Patent [19]

Stone

[11] 4,277,107
[45] Jul. 7, 1981

[54] SECURITY BOLTS FOR TRAILER WHEELS

[76] Inventor: Samuel L. Stone, 6327 La Jara, Lakewood, Calif. 90713

[21] Appl. No.: 43,444

[22] Filed: May 29, 1979

[51] Int. Cl.$^3$ ............................................. B60B 23/00
[52] U.S. Cl. .......................... 301/13 SM; 301/9 DN; 301/24; 411/403
[58] Field of Search .............. 301/9 DN, 9 DP, 13 R, 301/13 SM, 24, 36 R, 36 WP, 37 AT; 85/45, 35

[56] References Cited

U.S. PATENT DOCUMENTS

| | | | |
|---|---|---|---|
| 1,646,867 | 10/1927 | Nelson | 301/9 DN |
| 2,316,695 | 4/1943 | Jaffa | 301/9 DN |
| 3,080,198 | 3/1963 | Dean et al. | 301/13 SM |
| 3,821,975 | 7/1974 | Hakef | 85/45 |

*Primary Examiner*—H. Grant Skaggs
*Attorney, Agent, or Firm*—John T. Matlago

[57] ABSTRACT

A conventional set of dual wheels having rims with tires thereon are effectively locked on a wheel hub mounted on the end of an axle on a trailer chassis by replacing two of the studs and hexagonal nuts, normally provided for holding the dual wheels on the wheel hub, with security bolts. When the threaded ends of the security bolts are engaged on the wheel hub, their cylindrical heads are of such a size as to substantially abut the underside of the cylindrical surface of the rim of the outer wheel of the set of dual wheels. Each security bolt has a square opening provided on the end of the cylindrical head thereof to receive the square projection on the end of an adaptor provided for a wrench which is also used for tightening and loosening the hexagonal nuts. Such a structural arrangement makes it difficult, if not impossible, to loosen the security bolts as needed to remove the wheels from the wheel hub while the trailer is parked at a terminal.

7 Claims, 4 Drawing Figures

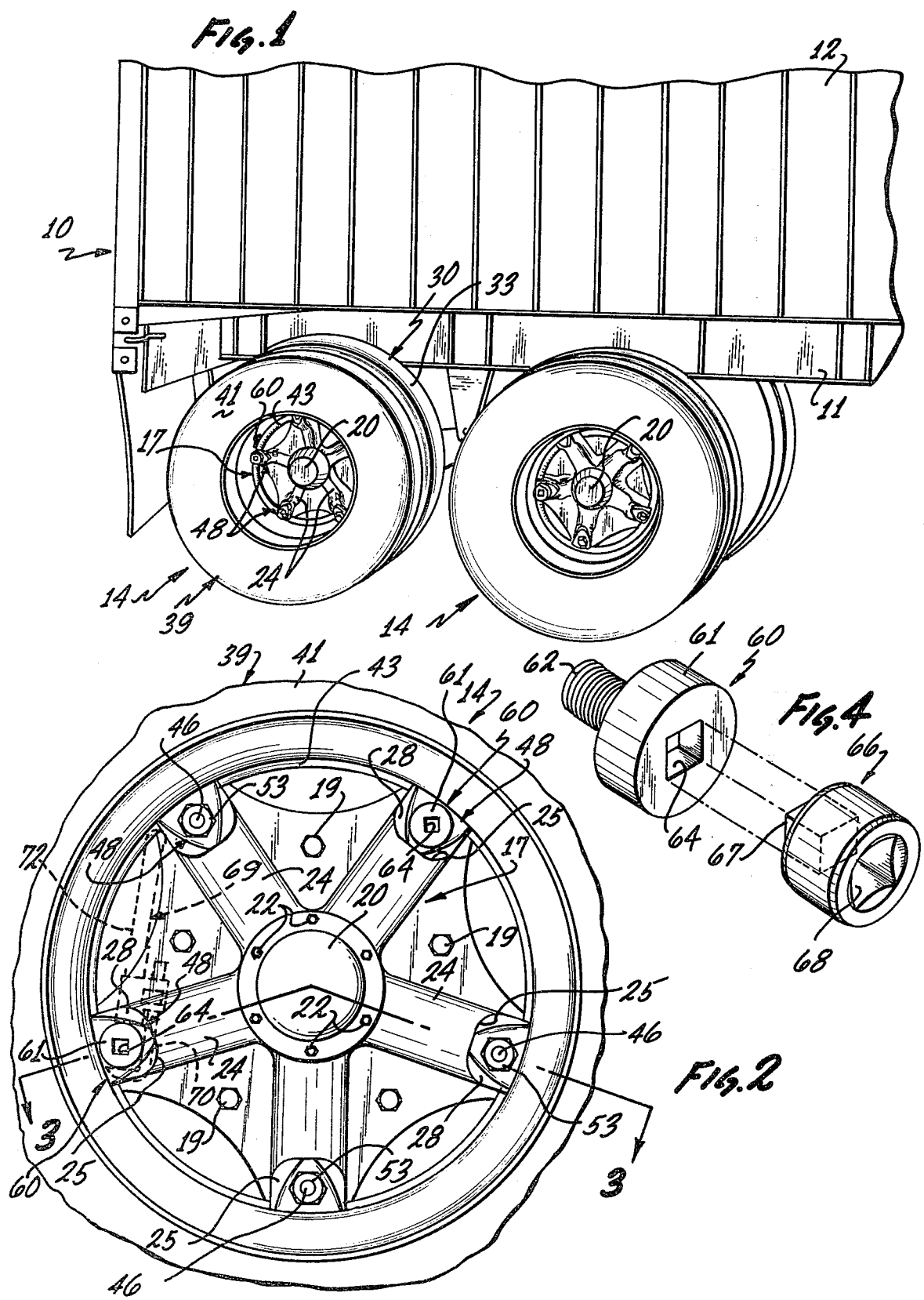

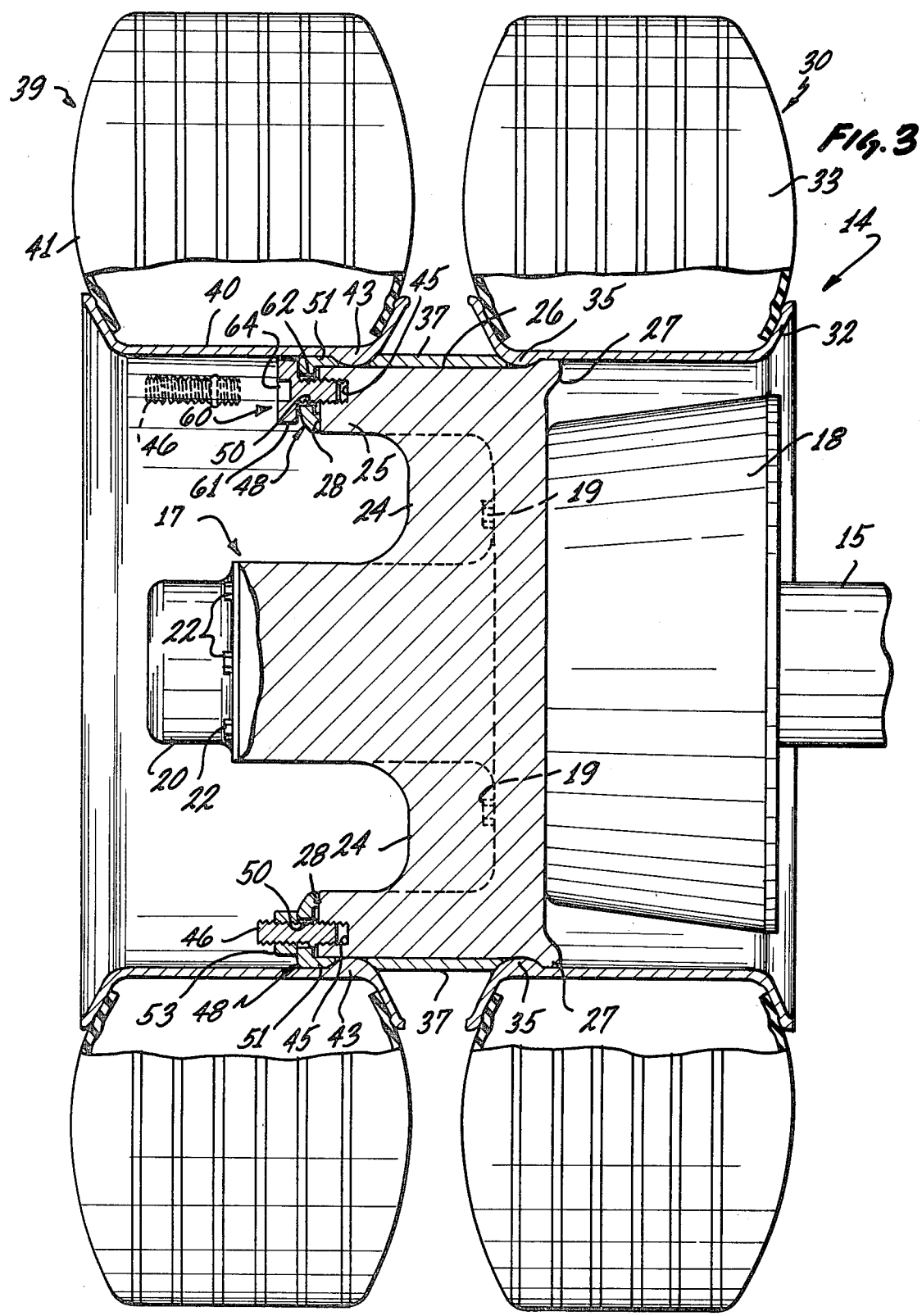

4,277,107

SECURITY BOLTS FOR TRAILER WHEELS

BACKGROUND AND SUMMARY OF THE INVENTION

This invention relates to trailer chassis and more particularly to security bolts especially adapted for holding dual wheels on a wheel hub mounted on the end of an axle thereof.

It is the practice to park a large number of trailers at terminals near a port for commercial navigation. The trailers are used to haul cargo to the port for placement on a ship and are then left at the terminals until needed again. Since the terminals are not being constantly guarded, the wheels, of which there are four pair on each trailer, often are stolen. This is especially a problem because of the ease with which the outer wheels can be slipped off the wheel hubs to which they are attached, without the need for jacking up the rear end of the trailer.

Conventionally the rims of a pair of inner and outer wheels with a spacer in between are slipped over the periphery of a wheel hub mounted on the end of a rear axle of a trailer chassis. The inner wheel rim engages flanges on the peripheries of spokes of the wheel hub and the outer wheel rim is engaged by end clamps attached by studs and nuts to faces on the outer ends of the spokes of the wheel hub.

In accordance with the present invention, the studs and hexagonal nuts provided on the faces of two of the five spokes of a wheel hub for holding the inner and outer wheels by their rims are replaced by security bolts. Each security bolt has a cylindrical head of such a diameter that when its threaded end is engaged on the wheel hub, the side of its cylindrical head substantially contacts the inside wall of the rim of the outer wheel. The cylindrical head of the security bolt is provided with an opening for receiving a non-standard size projection provided on one end of an adaptor whose opposite end is adapted to mate with the end of a standard wrench. With such a structural arrangement, it is very difficult to loosen the security bolts as needed to remove the wheels of the trailers while the trailers are being parked at terminals near a port, for example, thus preventing theft of the wheels.

Accordingly, one of the objects of the present invention is to provide for holding, i.e., effectively locking, wheels on a trailer by the use of security bolts which are designed so that they can not be removed with a standard wrench.

Still another object of the present invention is to provide for holding wheels on a trailer by replacing two non-adjacent studs and hexagonal nuts on the wheel hub with security bolts that require a special adaptor to effect their removal by the wrench used for removing the hexagonal nuts.

With these and other objects in view, the invention consists of the construction, arrangement, and combination of the various parts of the device, whereby the objects contemplated are attained, as hereinafter set forth, pointed out in the appended claims and illustrated in the accompanying drawings.

BRIEF DESCRIPTION OF THE DRAWINGS

FIG. 1 is a perspective view of the rear portion of a typical trailer showing the dual wheel assemblies mounted on the ends of the rear axles thereof;

FIG. 2 is a front view showing of a dual wheel assembly mounted on an axle of the trailer;

FIG. 3 is a vertical sectional view of the dual wheel assembly mounted on the axle as taken along line 3—3 of FIG. 2; and FIG. 4 is a perspective view of the security bolt of the present invention together with an adaptor for coupling it to a standard wrench.

DETAILED DESCRIPTION OF THE PREFERRED EMBODIMENT

Referring to the drawings, a trailer 10 is shown comprising a chassis 11 carrying a detachable container 12. The chassis 11 is supported by dual wheel assemblies 14 mounted on each end of its two rear axles 15.

As shown in FIG. 3, each dual wheel assembly 14, which is conventional, comprises a wheel hub 17 carrying thereon an inner wheel 30 and an outer wheel 39. The wheel hub 17, which is attached by five equally spaced bolts and nuts 19 to a brake drum housing 18, is mounted by bearings (not shown) on the end of axle 15. A hub cap 20 is attached to the end of the wheel hub 17 by six nuts 22.

As shown in FIGS. 2 and 3, the wheel hub 17 is formed with five equally spaced radial spokes 24, the end portions 25 of which project forwardly in the axial direction. The outer periphery of each of the end portions 25 forms an arcuate surface 26 having an arcuate flange 27 on the rear thereof. The front face 28 of each end portion 25 is disposed normal to the arcuate surface 26 thereof.

With the wheel hub 17 mounted on the end of axle 15, to assemble the wheels thereon, the inner wheel 30 comprising a rim 32 carrying a tire 33 is first positioned over the arcuate surfaces 26 of the wheel hub. The rim 32 is provided with a cylindrical inside surface having an annular inward projection 35 on the outer end thereof which bears against the arcuate flanges 27 on the wheel hub.

A sleeve or spacer 37 is next positioned over the arcuate surfaces 26 of the wheel hub 17 such that the inner end of spacer 37 contacts the end of the annular inward projection 35 on the rim 32.

Finally, an outer wheel 39 comprising a rim 40 carrying a tire 41 is positioned over the arcuate surfaces 26 on the wheel hub 17. The rim 40 is provided with a cylindrical inside surface having an annular inward projection 43 on the inner end thereof which bears against the outer end of the sleeve 37.

A threaded hole 45 is conventionally provided on the front face 28 of each of the five end portions 25 on the wheel hub 17 in which one end of a threaded stud 46 is engaged. A clamp 48 having an arcuate stop 51 depending from the back thereof is then disposed on each of the front faces 28 of the wheel hub 17. The clamp 48 has a central opening 50 which loosely fits over the stud 46 such that the arcuate stop 51 of the clamp is positioned within the arcuate opening provided between the inside cylindrical surface of the rim 40 and the outside arcuate surface 26 of the end portion 25 of the spoke 24. Hexagonal nuts 53 are then provided on the outer ends of the threaded studs 46.

It should now be clear that when the hexagonal nuts 53 are tightened by use of a standard inpact wrench (not shown), for example, the arcuate stops 51 depending from the backs of the clamps 48 bear against the annular inward projection 43 on the rim 40 holding it against the sleeve 37. The sleeve 37, in turn, bears against the annular inward projection 35 on the rim 32, which, in turn, bears against the annular flanges 27 on the wheel hub 17.

It should now be clearly understood that conventionally a threaded stud 46 with a clamp 48 and a hexagonal nut 53 is provided on each of the faces 28 of the spokes 24 for holding the wheels 30 and 39 on the wheel hub 17 which is mounted on an end of the rear axle 15. These hexagonal nuts 53 can be tightened by the use of a standard impact wrench or manually operated wrench having a hexagonal socket thereon. Likewise, it should now be clearly understood that when it is desired to remove the wheels 30 and 39, for any reason, the hexagonal nuts 53 can be quickly disengaged by the use of a conventional wrench. In fact, when the nuts 53 are removed, the outer wheels 39 can be removed from the wheel hub 17 without the need for jacking up the trailer chassis 11 since the chassis 11 is being supported by the inner wheels 30. Such a holding means for engaging the wheels 30 and 39 makes it very easy for them to be stolen from the trailers being parked at an unguarded terminal. Moreover, by jacking up the trailer chassis 11, it should be clear that because of the manner in which the eight wheels are mounted and held by hexagonal nuts 53 which are readily engageable by a standard hand wrench, it is relatively easy to remove both the inner wheels 30 and the outer wheels 39 off the ends of the two rear axles 15.

The dual wheel assembly 14 so far described together with the studs 46 and nuts 53 for holding the inner and outer wheels 30 and 39 on the wheel hub 17 are conventional and provides the setting for the present invention which relates to modifying the means for holding the wheels 30 and 39 on the wheel hub 17 so that it is very difficult if not impossible to remove the wheels while the trailer is being parked in an unguarded terminal, for example.

Thus, in accordance with the present invention, two of the threaded studs 46 are removed, as shown in the drawings, from preferably non-adjacent faces 28 of the five end portions 25 of the wheel hub 17. Then, a security bolt 60 having a cylindrical head 61 and a threaded end 62 is used to replace the threaded studs 46 and the hexagonal nut 53 normally provided on these two faces 28. Thus, with the two threaded studs 46 removed, the clamps 48 are positioned, as before, on the two faces 28 of the spokes 24 with their arcuate stops 51 fitted in the arcuate space formed between the outer cylindrical surface of the wheel hub 17 and the inner cylindrical surface of the rim 40. The threaded ends 62 of the security bolts 60 are then inserted through the central openings 50 in the clamps 48 so as to engage the threaded openings 45.

In order to be able to tighten the security bolts 60, the end of the cylindrical head 61 of each is provided with a square central opening 64, of a non-standard size of, for example, five-eighths of an inch. An adaptor 66 is then provided having a five-eighths of an inch square projection 67 on one end thereof for fitting into the opening 64 on the head 61 of security bolt 60. The opposite end of adaptor 66 is provided with a three-quarter inch square opening 69 for receiving the end of a standard impact wrench, for example. This enables the security bolts 60 to be tightened and loosened with the same impact wrench used to tighten or loosen the hexagonal nuts 53. Such an adaptor 66 is generally not readily available as a standard item. The security bolt 60 is made of machine steel and is heat treated to 45 Rockwell so that it will withstand the impact force when the square projection 67 of the adaptor 66 for the impact wrench is mated in the square opening 64 thereof.

It should now be clearly understood that the diameter of the cylindrical head 61 of security bolt 60 is made large enough so that when the threaded end 62 thereof is engaged in the threaded hole 45 on the face 28 of the spoke 24, the side of the cylindrical head 61 substantially abuts against the inner cylindrical wall of the rim 40. Furthermore, it should be appreciated that the locating of the security bolts 60 in the bottom of the well formed by the cylindrical rim 40 makes them relatively inaccessible.

It should now be clearly understood that the two security bolts 60 provided on the faces 28 of the wheel hub 17 to hold the rims of the wheels 30 and 39 makes it virtually impossible to remove these wheels without the use of the wrench adaptor 66. Clearly the wheels can not be removed by the standard impact wrench or manual wrench normally used for engaging the hexagonal nuts 53.

It should be appreciated that in addition to needing an adaptor 66 for the standard wrench to be able to disengage the security bolts 60, it is also necessary to have, if an impact wrench is to be used, a source of pressurized air to operate the impact wrench and this is not generally available at the terminal where the trailers are being parked.

Inasmuch as the cylindrical head 60 corresponds to a portion of a pipe, one might attempt to use a pipe wrench 69, for example, as illustrated in dotted lines in FIG. 2, to remove the security bolts 60. However, it should be evident that it would not be possible for the head 70 of the pipe wrench to grip the smooth hardened cylindrical surface of the head 61 of the security bolt 60 and still be able to rotate the handle 62 of the pipe wrench 69 within the confines of the well formed by rim 40 as needed to remove the security bolt 60. Note, particularly, that with the head 61 of the security bolt 60 substantially contacting the inner cylindrical wall of the rim 40, it is not possible to insert the outer end of the jaw of the head 70 of the pipe wrench 69 about the back of the head 61 of security bolt 60.

It should now be clearly understood that at least two of the threaded studs 46 on the wheel hub 17, not adjacent to each other, must be removed to enable their replacement by the security bolts 60 of the present invention. This is because if only one of the threaded studs 46 were so replaced, it would be possible to remove the remaining four hexagonal nuts 53 by use of a standard manual wrench, for example, and then remove the outer wheel 39 without being concerned about the one security bolt 60 which is still secured in position. This is because it would be possible to swing the outer wheel 39 about the engaging security bolt 60 and slip the projection 43 on the rim 40 over the arcuate stop 51, thus freeing it.

It should be evident that the entire dual wheel assembly 14 could be freed for sliding off the end of the rear axle 15 by removing the six screws 22 which hold the hub cap 20. However, this would not only require that the trailer be jacked up, but would be very difficult to accomplish because of the large weight of the entire dual wheel assembly 14.

While the preferred embodiment of the device as described herein is well adapted to fulfill the objects and advantages previously mentioned as desirable it is to be understood that the invention is not limited to the specific features shown and described but that the means and configuration herein disclosed are susceptible of modification in form, proportion and arrangement of parts without departing from the principles involved or sacrificing any of its advantages and the invention is therefore claimed in embodiments of various forms all coming within the scope of the claims which follows:

1. Apparatus for preventing unauthorized removal of tires from wheels where the tires are mounted on demountable cylindrical rims which are in turn held in place on the periphery of a wheel hub, said apparatus comprising: a plurality of end clamps angularly spaced about the wheel hub, each said end clamp having a lug portion for wedging against the rim to hold the rim in place on the wheel hub, threaded studs and hexagonal nuts for attaching some of said end clamps on the wheel hub, and security bolts having threaded ends and cylindrical heads for attaching the remaining ones of said end clamps on the wheel hub, each said cylindrical head having a diameter whereby, when the threaded end of the security bolts engages said wheel hub, the side of the cylindrical head substantially contacts the inner cylindrical surface of said rim, and wherein each said cylindrical head has a key opening on the end thereof for receiving a complementary key projection on an adaptor for a wrench by which said security bolt can be rotated.

2. Apparatus as defined in claim 1 wherein said security bolts are used to attach non-adjacent end clamps to the wheel hub.

3. Apparatus as defined in claim 1 wherein the opening in the end of the cylindrical head of said security bolt is square.

4. Apparatus as defined in claim 1 wherein a five-eighths of an inch square opening is provided in the end of the cylindrical head.

5. Apparatus as defined in claim 1 wherein said security bolt is made of a hardened steel.

6. Apparatus for preventing unauthorized removal of a pair of inner and outer tires carried on demountable cylindrical rims which are in turn held in place in tandem on the periphery of a wheel hub having a plurality of equally spaced vertically disposed end faces with threaded holes therein, said apparatus comprising: clamps on each of said end faces having openings aligned with the threaded holes thereof and having lugs on the ends thereof positioned to wedge against the inner end of the outer rim, threaded studs engaging the threaded holes in some of said end faces and extending through the openings in the clamps thereon, hexagonal nuts on the ends of said threaded studs for holding the clamps in place, and security bolts having threaded ends extending through the openings in the clamps and engaging the threaded holes in the remaining end faces for holding said latter clamps in place, each said security bolt having a cylindrical head of a diameter such that when the threaded end of said bolt is engaged in the threaded hole in the end face the side of said cylindrical head substantially abuts the underside of the outer rim, and each said security bolt having a key opening in the end of the head thereof for receiving a complementary key projection on the end of a wrench adaptor.

7. In apparatus for holding a pair of inner and outer tires mounted on demountable cylindrical rims which are in turn held in tandem on the periphery of a wheel hub, said wheel hub having a plurality of angularly spaced peripheral arcuate surface portions with flanges on the inner ends thereof, and said wheel hub having a front face adjacent each said arcuate surface portion, an inner cylindrical rim having an annular inward projection on the outer end thereof abutting the flanges on said wheel hub, a cylindrical spacer fitted over the arcuate surface portions of the wheel hub and having an end abutting said annular inward projection on the inner cylindrical rim, an outer cylindrical rim having an annular inward projection on the inner end thereof abutting against the other end of said spacer, a clamp having an end lug fitted on the outer edge corner of each of the arcuate surface portions of said wheel hub and having an opening aligned with a threaded hole in each of the front faces of said wheel hub, each said end lug abutting against the annular inward projection on the outer cylindrical rim, a stud threadably engaging each of some of the threaded holes in the front faces of said wheel hub and extending through the openings of the clamps thereon, and a hexagonal nut on the outer end of each said stud for holding said clamp in place, the combination wherein a security bolt having a threaded end passes through the opening of a clamp and engages each of the remaining threaded holes on the front faces of said wheel hub to hold said latter clamps in place, each said security bolt having a cylindrical head of a diameter so as to substantially contact the cylindrical inner surface of said outer rim, and each said security bolt having a key opening in the head thereof for receiving a complementary projecting key of an adaptor to enable a wrench to apply a torque to the security bolt to rotate the same in either direction.

* * * * *